United States Patent
Takeuchi et al.

(10) Patent No.: US 9,568,050 B2
(45) Date of Patent: Feb. 14, 2017

(54) ELECTROMAGNETIC FRICTIONAL ENGAGEMENT APPARATUS

(71) Applicant: JTEKT CORPORATION, Osaka-shi (JP)

(72) Inventors: Yoshiki Takeuchi, Kariya (JP); Kunihiko Suzuki, Gamagori (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/142,285

(22) Filed: Apr. 29, 2016

(65) Prior Publication Data

US 2016/0333946 A1 Nov. 17, 2016

(30) Foreign Application Priority Data

May 13, 2015 (JP) ................................. 2015-098420

(51) Int. Cl.
| | |
|---|---|
| F16D 37/02 | (2006.01) |
| F16D 27/06 | (2006.01) |
| F16D 27/14 | (2006.01) |
| F16D 13/74 | (2006.01) |

(52) U.S. Cl.
CPC .............. *F16D 27/06* (2013.01); *F16D 13/74* (2013.01); *F16D 27/14* (2013.01)

(58) Field of Classification Search
CPC ........... F16D 27/06; F16D 13/74; F16D 27/14
See application file for complete search history.

(56) References Cited

U.S. PATENT DOCUMENTS

| | | | | |
|---|---|---|---|---|
| 6,169,347 B1 * | 1/2001 | Sakamoto | ............... | F16D 27/06 192/84.95 |
| 6,298,967 B1 * | 10/2001 | Sakamoto | ............... | F16D 27/06 192/84.951 |
| 8,011,488 B2 * | 9/2011 | Yamaguchi | ............. | F16D 27/06 192/84.951 |
| 9,080,614 B2 * | 7/2015 | Tsuda | ...................... | F16D 13/64 |
| 2007/0080036 A1 * | 4/2007 | Elie | ......................... | F16D 27/06 192/21.5 |
| 2011/0227436 A1 * | 9/2011 | Ishida | ..................... | F16D 27/06 310/78 |

(Continued)

FOREIGN PATENT DOCUMENTS

JP 2005-3167 1/2005

*Primary Examiner* — David J Hlavka
(74) *Attorney, Agent, or Firm* — Oblon, McClelland, Maier & Neustadt, L.L.P.

(57) ABSTRACT

The electromagnetic frictional engagement apparatus includes a housing member in which a housing space is formed, a clutch portion that couples the housing member in a disengageable manner to a shaft disposed so as to be rotatable relative to the housing member, and an electromagnetic coil that generates a magnetic force that actuates the clutch portion. The clutch portion has an outer clutch plate and an inner clutch plate that forms a magnetic path for a magnetic flux generated by the electromagnetic coil. Lubrication grooves through which a lubricant flows are formed in the inner clutch plate. Among the lubrication grooves, the total of groove areas of a portion of the lubrication grooves that is included in the magnetic path is 90 to 110% of a maximum lubrication groove area, so that magnetic flux density resulting from saturation of the magnetic path with magnetic fluxes is not reduced.

4 Claims, 7 Drawing Sheets

(56) References Cited

U.S. PATENT DOCUMENTS

2014/0060241 A1\* 3/2014 Atkins .................... F16F 15/18
                                                    74/572.11
2014/0182995 A1\* 7/2014 Ando ..................... F16D 13/62
                                                    192/107 R \* cited by examiner

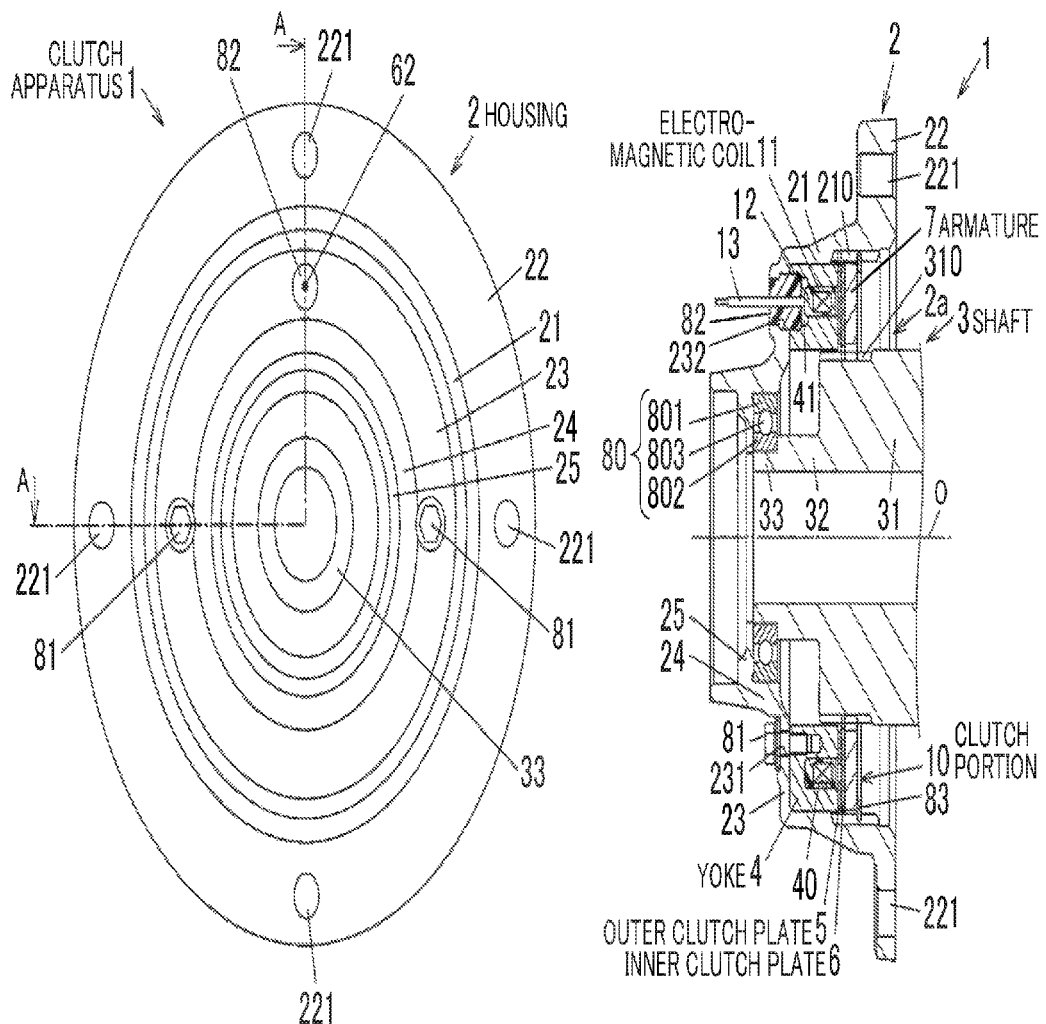

(FIRST EMBODIMENT, INOPERATIVE STATE)

(FIRST EMBODIMENT, OPERATIVE STATE)

FIG. 3
(FIRST EMBODIMENT)
PLAN VIEW
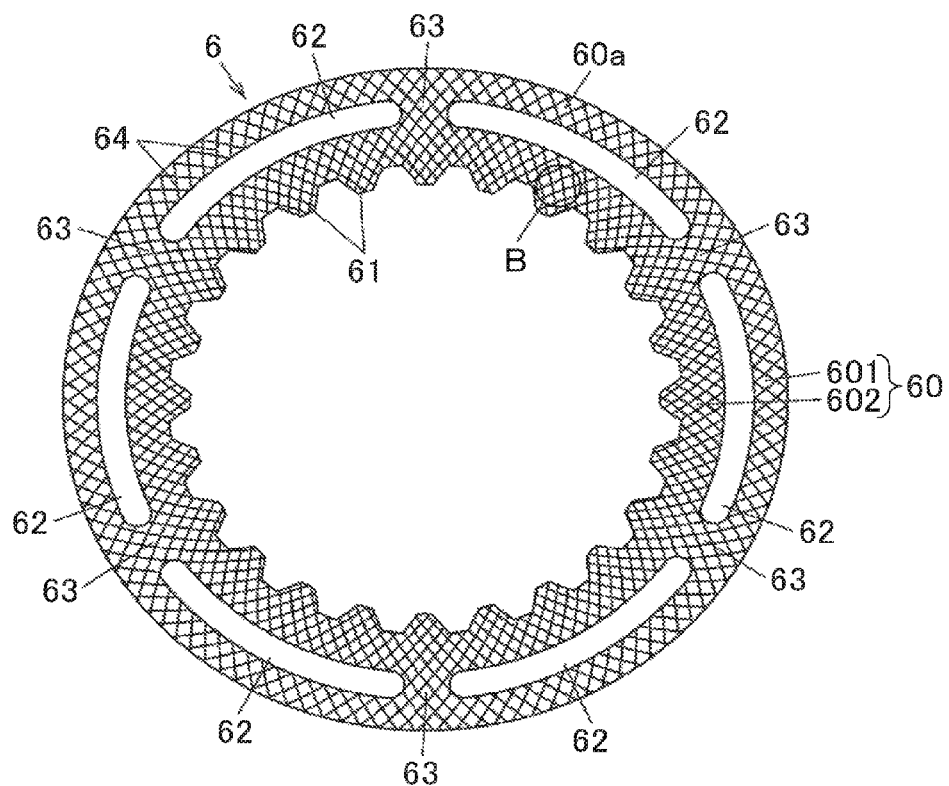
ENLARGED B PORTION
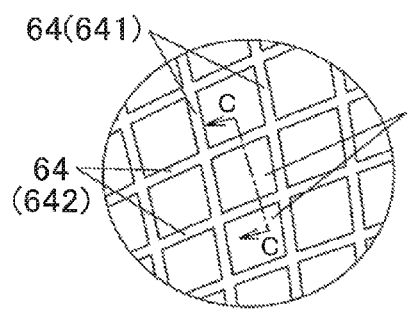
SECTION C-C
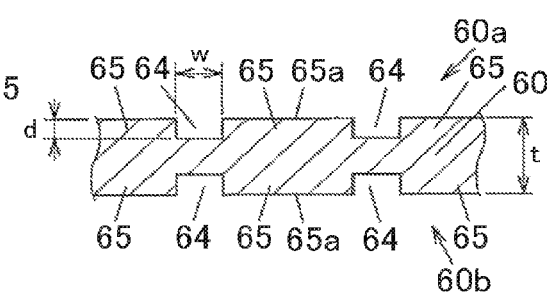

(FIRST EMBODIMENT)

(SECOND EMBODIMENT)

FIG.6
(SECOND EMBODIMENT)
PLAN VIEW
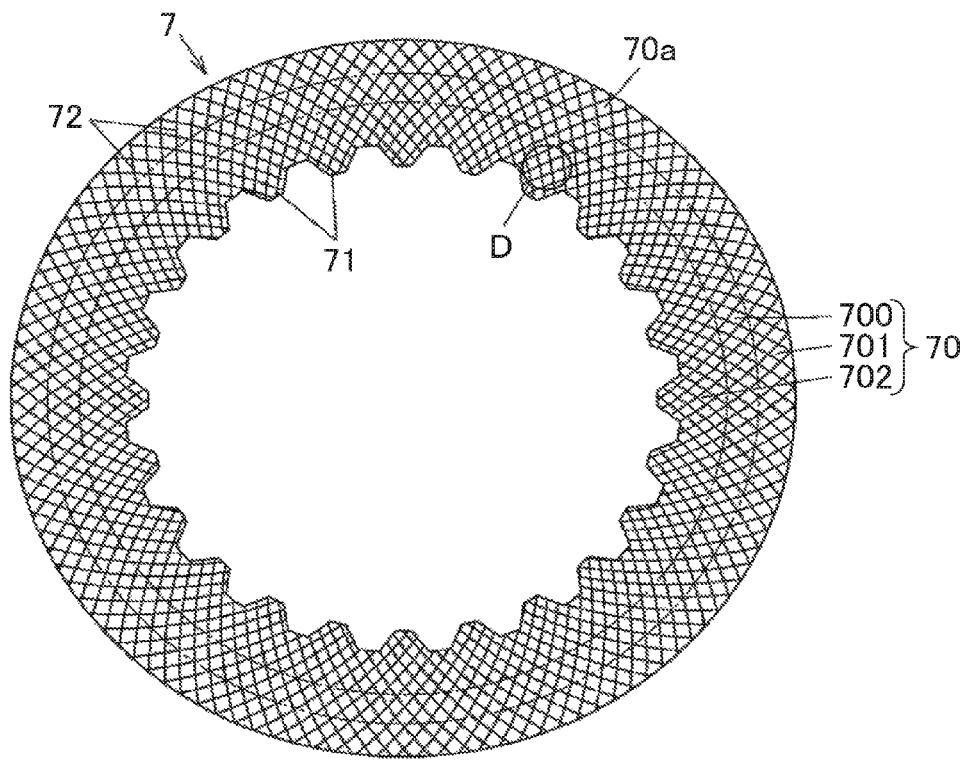
ENLARGED D PORTION
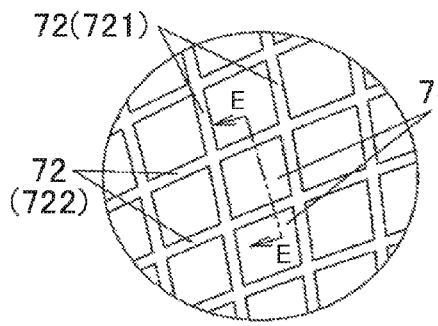
SECTION E-E
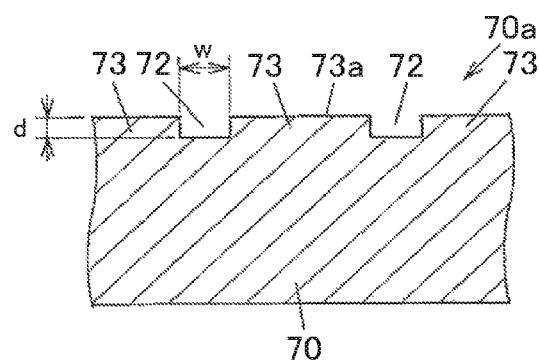

ELECTROMAGNETIC FRICTIONAL ENGAGEMENT APPARATUS

INCORPORATION BY REFERENCE

The disclosure of Japanese Patent Application No. 2015-098420 filed on May 13, 2015 including the specification, drawings and abstract, is incorporated herein by reference in its entirety.

BACKGROUND OF THE INVENTION

1. Field of the Invention

The invention relates to an electromagnetic frictional engagement apparatus that causes a frictional force to be generated between a plurality of soft magnetic bodies by a magnetic force.

2. Description of the Related Art

Clutch apparatuses that cause a frictional force to be generated between a plurality of soft magnetic bodies by a magnetic force have been used, for example, for vehicles.

A driving force transmitting apparatus described in Japanese Patent Application Publication No. 2005-3167 (JP 2005-3167 A) includes an electromagnetic frictional engagement apparatus including an electromagnetic pilot clutch and a main clutch. The main clutch has a cam mechanism that converts a torque transmitted by the pilot clutch into an axial thrust, and a main outer clutch plate and a main inner clutch plate that are pressed by the thrust from the cam mechanism. The pilot clutch and the main clutch are disposed in a housing space in a bottomed cylindrical housing. A lubricant is sealed in the housing space.

The pilot clutch includes a pilot outer clutch plate and a pilot inner clutch plate that are soft magnetic bodies, and is disposed between a rear housing and an armature that are magnetic-path forming members. An electromagnetic coil and a yoke are disposed in a recessed portion formed in the rear housing. When a magnetic force of the electromagnetic coil attracts the armature toward the rear housing, the pilot outer clutch plate and the pilot inner clutch plate come into frictional contact with each other. A magnetic flux resulting from conduction of a current through the electromagnetic coil passes through the yoke, the rear housing, the pilot outer clutch plate, the pilot inner clutch plate, and the armature. A air gap is formed between the yoke and the rear housing and is contained in the magnetic path of the magnetic flux resulting from conduction of a current through the electromagnetic coil.

In the pilot outer clutch plate, lubrication grooves are formed through which a lubricant flows. The lubricant flowing through the lubrication grooves suppresses friction when the pilot outer clutch plate and the pilot inner clutch plate rotate relatively while frictioning each other, and also inhibits possible seizure of the pilot clutch.

The electromagnetic clutch (pilot clutch) configured as described above may be subjected to a slight torque transmitted even in an inoperative state where conduction of a current through the electromagnetic coil is blocked, that is, what is called a drag torque. The drag torque results from the viscosity of the lubricant when the distance between the relatively rotating members is short.

The inventors of the present invention have made earnest effort to reduce the drag torque and found that the drag torque can be reduced by increasing the width or the number of lubrication grooves to make the groove area of the lubrication grooves larger to allow a sufficient amount of lubricant to be fed to between the relatively rotating members. However, the increased groove area may increase resistance of a magnetic circuit to reduce the frictional force that can be generated between these members.

SUMMARY OF THE INVENTION

An object of the present invention is to provide an electromagnetic frictional engagement apparatus that enables a reduction in drag torque while suppressing a decrease in frictional force that may result from loss of a magnetic flux from an electromagnetic coil.

According to an aspect of the present invention, an electromagnetic frictional engagement apparatus includes:

a housing member in which a housing space is formed;

a clutch portion housed in the housing space to couple the housing member in a disengageable manner to a rotating member disposed so as to be rotatable relative to the housing member; and an electromagnetic coil that generates a magnetic force that actuates the clutch portion, wherein the clutch portion has a plurality of soft magnetic materials that forms a magnetic path for a magnetic flux resulting from conduction of a current through the electromagnetic coil, for some of the soft magnetic materials, rotation relative to the housing is regulated, for others of the soft magnetic materials, rotation relative to the rotating member is regulated, and the some of the soft magnetic materials and the others of the soft magnetic materials come into frictional contact with one another by the magnetic force to suppress relative rotation between the housing member and the rotating member, lubrication grooves through which a lubricant flows are formed in at least some of contact surfaces of the soft magnetic materials, and among the lubrication grooves formed in the contact surfaces of the soft magnetic materials, a total of groove areas of a portion of the lubrication grooves that is included in the magnetic path is 110% or less of a maximum lubrication groove area that is a maximum value of the total of the groove areas within a range that magnetic flux density resulting from saturation of the magnetic path with magnetic fluxes is not reduced.

The electromagnetic frictional engagement apparatus according to the above aspect enables a reduction in drag torque while suppressing a decrease in frictional force that may result from loss of a magnetic flux from an electromagnetic coil.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a front view of a clutch apparatus according to a first embodiment of the invention as seen in an axial direction and a sectional view of the clutch apparatus taken along line A-A;

FIG. 3 is a plan view depicting an inner clutch plate, an enlarged view of a B portion in the plan view, and a C-C sectional view of the B portion in the enlarged view, the C-C sectional view depicting a sectional shape of the inner clutch plate;

FIG. 6 is a plan view depicting an armature, an enlarged view of a D portion in the plan view, and an E-E sectional view of the D portion in the enlarged view, the E-E sectional view depicting a sectional shape of the armature.

DETAILED DESCRIPTION OF EMBODIMENTS

A first embodiment of the invention will be described with reference to FIGS. 1 to 4.

Figure 2A:
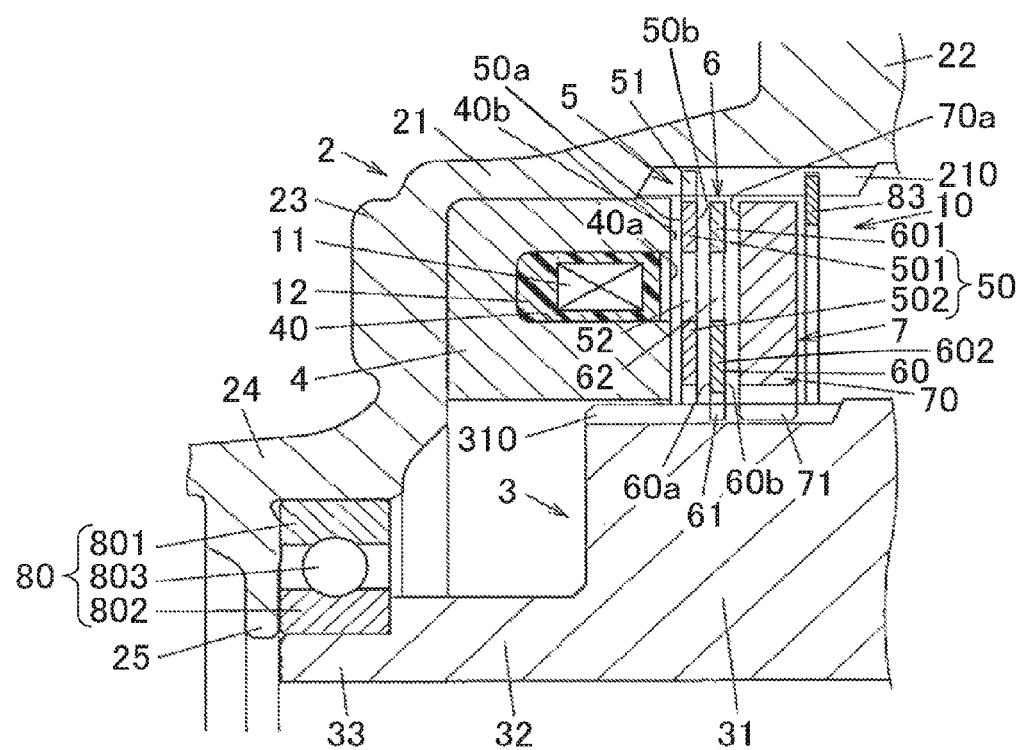
FIG. 2A is an enlarged view of a part of the clutch apparatus in an inoperative state, depicting a section of the part taken along the axial direction.
Figure 2B:
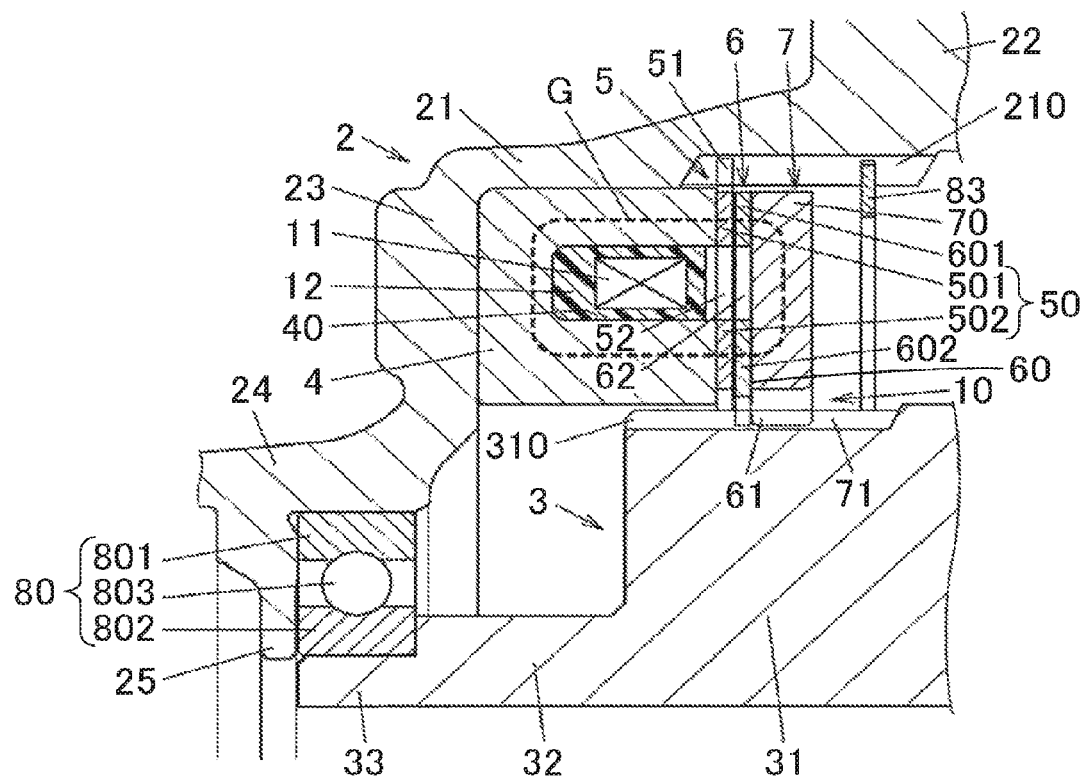
FIG. 2B is an enlarged view of the part of the clutch apparatus in an operative state, depicting the section of the part taken along the axial direction.

FIG. 1 is a front view depicting a clutch apparatus according to the first embodiment of the invention as seen in an axial direction and a sectional view of the clutch apparatus taken along line A-A. FIG. 2A is an enlarged view of a part of the clutch apparatus in an inoperative state, depicting a section of the part taken along the axial direction. FIG. 2B is an enlarged view of a part of the clutch apparatus in an operative state, depicting the section of the part taken along the axial direction.

A clutch apparatus 1 is an aspect of a frictional engagement apparatus in the invention. The clutch apparatus 1 includes a housing member 2 with a housing space 2a formed therein, a shaft 3 disposed so as to be rotatable relative to the housing member 2 and serving as a rotating member, a clutch portion 10 that couples the housing member 2 and the shaft 3 together in a disengageable manner, and an electromagnetic coil 11 that generates a magnetic force that actuates the clutch portion 10. The clutch apparatus 1 is a wet clutch apparatus used in a lubrication environment involving a lubricant, for example, in an automatic transmission in a vehicle. A lubricant is fed into the housing space 2a in the housing member 2 at a predetermined rate.

In the present embodiment, the housing member 2 is a non-rotating member fixed to a support member not depicted in the drawings, and rotation of the shaft 3 is braked while the clutch apparatus 1 is operative. In the description below, a direction parallel to a rotation axis O of the shaft 3 is simply referred to as an axial direction. A radial direction of the shaft 3 orthogonal to the axial direction is simply referred to as a radial direction.

The housing member 2 integrally has: a cylindrical portion 21 cylindrically formed around the rotation axis O of the shaft 3, serving as a central axis; a flange portion 22 erected on an outer peripheral surface of the cylindrical portion 21 at one end thereof in the axial direction; an annular bottom wall portion 23 formed so as to protrude inward from the other end of the cylindrical portion 21 in the axial direction; a cylindrical extending portion 24 extending from an inner peripheral end of the bottom wall portion 23 in a direction away from the cylindrical portion 21; and a protruding wall portion 25 protruding inward from an inner peripheral surface of a central portion of the extending portion 24 in the axial direction. On a part of an inner peripheral surface of the cylindrical portion 21 that is located close to an opening of the housing space 2a (away from the bottom wall portion 23), a spline engaging portion 210 is formed which includes a plurality of spline protrusions extending in the axial direction. In the flange portion 22, a plurality of bolt insertion holes 221 is formed through which bolts are inserted so that the housing member 2 is fixed to the support member.

The shaft 3 integrally has a large diameter portion 31, a medium diameter portion 32, and a small diameter portion 33. On an outer peripheral surface of the large diameter portion 31, a spline engaging portion 310 is formed which includes a plurality of spline protrusions extending in the axial direction. The shaft 3 is rotatably supported in the housing member 2 by a bearing 80 having an outer ring 801, an inner ring 802, and a plurality of rolling elements 803. The outer ring 801 is fitted and mounted inside the extending portion 24 of the housing member 2. A side surface of the outer ring 801 is in abutting contact with the protruding wall portion 25. The small diameter portion 33 of the shaft 3 is fitted and inserted inside the inner ring 802.

The clutch portion 10 has a plurality of soft magnetic bodies forming a magnetic path for a magnetic flux resulting from conduction of a current through the electromagnetic coil 11. For some of the soft magnetic bodies, rotation relative to the housing member 2 is regulated. For others of the soft magnetic bodies, rotation relative to the shaft 3 is regulated. In the present embodiment, the clutch portion 10 has a yoke 4, an outer clutch plate 5, an inner clutch plate 6, and an armature 7 as the soft magnetic bodies The yoke 4, the outer clutch plate 5, the inner clutch plate 6, and the armature 7 are formed of, for example, low-carbon steel, and are housed in the housing space 2a in the housing member 2. For the yoke 4 and the outer clutch plate 5, rotation relative to the housing member 2 is regulated. For the inner clutch plate 6 and the armature 7, rotation relative to the shaft 3 is regulated. The outer clutch plate 5 and the inner clutch plate 6 are disposed between the yoke 4 and the armature 7. The outer clutch plate 5 is located close to the yoke 4. The inner clutch plate 6 is located close to the armature 7.

The clutch portion 10 suppresses the relative rotation between the housing member 2 and the shaft 3 based on frictional contact between the outer clutch plate 5 and the inner clutch plate 6 resulting from a magnetic force of the electromagnetic coil 11.

The yoke 4 is fitted and inserted into the cylindrical portion 21 of the housing member 2. The yoke 4 is an annular member disposed around an outer periphery of the shaft 3. The yoke 4 is fixed to the housing member 2 by bolts 81 inserted through bolt insertion holes 231 formed in the bottom wall portion 23 of the housing member 2.

As depicted in FIG. 2A and FIG. 2B, the outer clutch plate 5 integrally has a main body portion 50 interposed between the yoke 4 and the inner clutch plate 6, and a plurality of engaging protrusions 51 that is provided in the outer periphery of the main body portion 50 and engages with the spline engaging portion 210 formed on the cylindrical portion 21 of the housing member 2. Surface roughening is applied to a first contact surface 50a of the main body portion 50 of the outer clutch plate 5 that contacts the yoke 4 and a second contact surface 50b of the main body portion 50 that contacts the inner clutch plate 6 so that a slight amount of lubricant is be held on the contact surfaces 50a, 50b. The surface roughness of the first and second contact surfaces 50a, 50b is set to a predetermined value at which the magnetic resistance in the magnetic path for the magnetic flux resulting from conduction of a current through the electromagnetic coil 11 is not affected.

The inner clutch plate 6 integrally has a main body portion 60 interposed between the outer clutch plate 5 and the armature 7, and a plurality of engaging protrusions 61 that engages with the spline engaging portion 310 formed on the large diameter portion 31 of the shaft 3. Lubrication grooves through which a lubricant flows are formed in a first contact surface 60a of the main body portion 60 of the inner clutch plate 6 that contacts the outer clutch plate 5 and in a second contact surface 60b of the main body portion 60 that contacts the armature 7. The lubrication grooves will be described below in detail.

The armature 7 integrally has a main body portion 70 that is annularly formed and that has a central portion through which the large diameter portion of the shaft 3 is inserted, and a plurality of engaging protrusions 71 that is provided so as to protrude from an inner side the main body portion 70 and that engages with the spline engaging portion 310 formed on the large diameter portion 31 of the shaft 3. For the armature 7, axial movement away from the yoke 4 with respect to the housing member 2 is regulated by a snap spring 83 fitted and mounted in an inner periphery of the cylindrical portion 21 of the housing member 2.

A contact surface 70a of the armature 7 that contacts the inner clutch plate 6 is formed like a flat surface with no groove.

With the engaging protrusions 51 engaged with the spline engaging portion 210 formed on the cylindrical portion 21 of the housing member 2, the outer clutch plate 5 is coupled to the housing member 2 so as to be movable in the axial direction and to be non-rotatable relative to the housing member 2. With the engaging protrusions 61 and 71 engaged with the spline engaging portion 310 formed on the large diameter portion 31 of the shaft 3, the inner clutch plate 6 and the armature 7 are coupled to the shaft 3 so as to be movable in the axial direction and to be non-rotatable relative to the shaft 3.

The electromagnetic coil 11 is configured, for example, by annularly winding an enameled wire that is a conducting wire coated with enamel. The electromagnetic coil 11 is sealed with a resin member 12. The electromagnetic coil 11 is electrically connected to a lead wire 13 extending from the resin member 12 to receive an excitation current fed through the lead wire 13. The lead wire 13 extends from a side surface of the resin member 12 that is close to the bottom wall portion 23. The lead wire 13 is connected to a control apparatus not depicted in the drawings. The control apparatus increases and reduces the amount of current supplied to the electromagnetic coil 11 via the lead wire 13, thereby controls the clutch apparatus 1.

In the yoke 4, an annular recessed portion 40 is formed which houses the electromagnetic coil 11 and the resin member 12. The recessed portion 40 has openings 40a in a side surface of the yoke 4 that is away from the bottom wall portion 23. In the present embodiment, this side surface is formed as a contact surface 40b of the yoke 4 that contacts the outer clutch plate 5. The contact surface 40b is formed like a flat surface with no groove.

The yoke 4 is provided with a guide hole 41 through which the lead wire 13 is guided to the exterior of the housing member 2 via a through-hole 232 formed in the bottom wall portion 23 of the housing member 2 (see section A-A in FIG. 1). The through-hole 232 penetrates the bottom wall portion 23 in the axial direction. A cap 82 that is synthetic rubber is disposed inside the through-hole 232 in the bottom wall portion 23 and inside the guide hole 41 in the yoke 4. The lead wire 13 penetrates the cap 82 in the axial direction.

In the outer clutch plate 5 and the inner clutch plate 6, a plurality of circular-arc-shaped slits 52 and 62 is formed at positions corresponding to the openings 40a in the recessed portion 40 formed in the yoke 4. The circular-arc-shaped slits 52 and 62 inhibit short-circuiting of the magnetic flux resulting from conduction of a current through the electromagnetic coil 11. The slits 52 formed in the outer clutch plate 5 separate the main body portion 50 of the outer clutch plate 5 into an outer-peripheral main body portion 501 and an inner-peripheral main body portion 502. Similarly, the slits 62 formed in the inner clutch plate 6 separate the main body portion 60 of the inner clutch plate 6 into an outer-peripheral main body portion 601 and an inner-peripheral main body portion 602.

An upper figure in FIG. 3 is a plan view depicting the entire inner clutch plate 6. The plan view illustrates the first contact surface 60a of the inner clutch plate 6, which faces the outer clutch plate 5. Lower figures in FIG. 3 are an enlarged view of a B portion in the plan view and a C-C sectional view of the B portion in the enlarged view. The C-C sectional view depicts a sectional shape of the inner clutch plate 6.

The main body portion 60 of the inner clutch plate 6 is provided with six circular-arc-shaped slits 62. The slits 62 are formed to align in a circumferential direction of the inner clutch plate 6 and penetrate the inner clutch plate 6 in a thickness direction thereof. Coupling portions 63 are each provided between two slits 62 that are adjacent each other. The coupling portions 63 couple the outer-peripheral main body portions 601 located on the outer peripheral side with respect to the slits 62 to the inner-peripheral main body portions 602 located on the inner peripheral side with respect to the slits 62 in the radial direction. Although not depicted in the drawings, the outer clutch plate 5 is also provided with a plurality of coupling portions similar to the coupling portions 63 of the inner clutch plate 6.

In the present embodiment, a plurality of the lubrication grooves 64 is formed all over the surface of the inner clutch plate 6. The lubrication grooves 64 include a plurality of first lubrication grooves 641 inclined in a first direction with respect to the radial direction of the inner clutch plate 6 and a plurality of second lubrication grooves 642 inclined in a second direction with respect to the radial direction of the inner clutch plate 6. The first lubrication grooves 641 and the second lubrication grooves 642 have an equal groove width and an equal groove depth. The first lubrication grooves 641 and the second lubrication grooves 642 cross one another in a lattice form. Quadrangular land portions 65 are each formed between a pair of adjacent first lubrication grooves 641 and a pair of adjacent second lubrication grooves 642. A top surface 65a of each land portion 65 is shaped like a flat surface. Similar lubrication grooves 64 and similar land portions 65 are also formed in the second contact surface 60b.

The lubrication grooves 64 have a groove width w of, for example, 0.3 mm. The lubrication grooves 64 have a groove depth d of, for example, 0.16 mm. The inner clutch plate 6 has a thickness t of, for example, 0.8 mm.

The lubrication grooves 64 may not be formed in the engaging protrusions 61. The lubrication grooves 64 may not be formed in the coupling portions 63. The lubrication grooves 64 may not necessarily be formed all over the first contact surface 60a. The lubrication grooves 64 may be formed at least in a part of the first contact surface 60a. This also applies to the lubrication grooves 64 in the second contact surface 60b.

Conduction of a current through the electromagnetic coil 11 allows a magnetic flux to be generated in a magnetic path G extending through the yoke 4, the outer-peripheral main body portion 501 of the outer clutch plate 5, the outer-peripheral main body portion 601 of the inner clutch plate 6, the armature 7, the inner-peripheral main body portion 602 of the inner clutch plate 6, and the inner-peripheral main body portion 502 of the outer clutch plate 5 as depicted in FIG. 2B. In FIG. 2B, the magnetic path G is depicted by a dashed line.

The magnetic flux generated in the magnetic path G attracts the armature 7 toward the yoke 4 to press the outer clutch plate 5 and the inner clutch plate 6 toward the yoke 4. Consequently, the contact surface 40b of the yoke 4 comes into contact with the first contact surface 50a of the outer clutch plate 5. The second contact surface 50b of the outer clutch plate 5 comes into contact with the first contact surface 60a of the inner clutch plate 6. The second contact surface 60b of the inner clutch plate 6 comes into contact with the contact surface 70a of the armature 7. The relative rotation between the housing member 2 and the shaft 3 is suppressed by a frictional force resulting from the contact between the second contact surface 50b of the outer clutch plate 5 and the first contact surface 60a of the inner clutch plate 6.

On the other hand, when a current supply to the electromagnetic coil 11 is blocked, the armature 7 does not press the outer clutch plate 5 and the inner clutch plate 6, which eliminates the frictional force between the outer clutch plate 5 and the inner clutch plate 6. The shaft 3 can thus rotate freely with respect to the housing member 2. However, a lubricant is interposed between the outer clutch plate 5 and the inner clutch plate 6, and thus, the viscosity of the lubricant causes a drag torque to be generated. The drag torque acts as a rotational resistance when the shaft 3 rotates with respect to the housing member 2.

Now, among the lubrication grooves (the lubrication grooves 64 in the inner clutch plate 6) formed in the contact surfaces (the contact surface 40b of the yoke 4, the first and second contact surfaces 50a and 50b of the outer clutch plate 5, the first and second contact surfaces 60a and 60b of the inner clutch plate 6, and the contact surface 70a of the armature 7) of the soft magnetic materials (the yoke 4, the outer clutch plate 5, the inner clutch plate 6, and the armature 7) in the clutch portion 10, the total of groove areas of a portion of the lubrication grooves that is included in the magnetic path G is defined as a total groove area. In the present embodiment, the lubrication grooves are formed only in the first and second contact surfaces 60a and 60b of the inner clutch plate 6. Thus, the total groove area of these lubrication grooves is equal to the total groove area of the lubrication grooves 64 in the first and second contact surfaces 60a and 60b of the outer-peripheral main body portion 601 and inner-peripheral main body portion 602 of the inner clutch plate 6.

The total groove area S of the lubrication grooves 64 in the first and second contact surfaces 60a and 60b of the outer-peripheral main body portion 601 and inner-peripheral main body portion 602 can be determined by an arithmetic expression $S = w \times L$ when the groove width of the lubrication groove 64 is denoted by w and the overall length of the plurality of lubrication grooves 64 in the first and second contact surfaces 60a and 60b of the outer-peripheral main body portion 601 and inner-peripheral main body portion 602 is denoted by L.

A magnetic flux density in the magnetic path G increases consistently with current flowing through the electromagnetic coil 11. An increased magnetic flux density increases the frictional force between the outer clutch plate 5 and the inner clutch plate 6. When a current fed from the control apparatus to the electromagnetic coil 11 reaches a predetermined value or larger, the magnetic path is saturated with magnetic fluxes, and the magnetic flux density has a constant value regardless of whatever larger current is passed through the electromagnetic coil 11.

Figure 4:
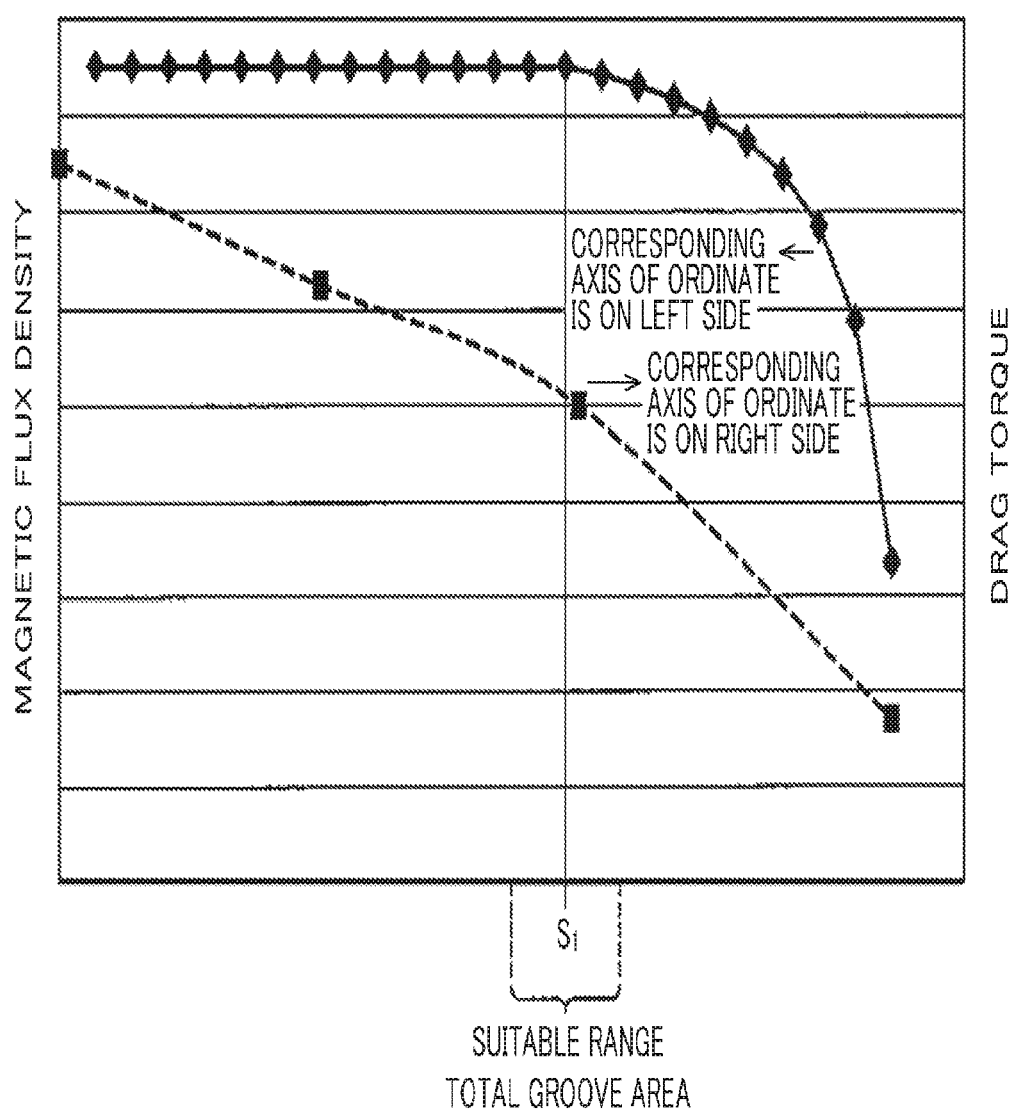
FIG. 4 is a graph illustrating a relation between a total groove area and a magnetic flux density and a drag torque.

FIG. 4 is a graph illustrating a relation between the total groove area and the magnetic flux density observed when the maximum current is fed from the control apparatus to the electromagnetic coil 11. In the graph, an axis of abscissas represents the total groove area, and a first axis of ordinate (left axis) represents the magnetic flux density. The relation between the total groove area and the magnetic flux density is represented by a solid line. Furthermore, in the graph, a second axis of ordinate (right axis) represents the drag torque, and a relation between the total groove area and the drag torque is represented by a dashed line.

As depicted in FIG. 4, the magnetic flux density is constant when the total groove area is equal to or smaller than S1 and starts to gradually decrease when the total groove area exceeds the predetermined value S1. The predetermined value S1 is the maximum value of the total groove area within a range that the magnetic flux density resulting from saturation of the magnetic path G with magnetic fluxes is not reduced. The maximum value (predetermined value S1) of the total groove area is defined as a maximum lubrication groove area.

On the other hand, the drag torque decreases gradually with increasing total groove area. In an example illustrated in FIG. 4, the drag torque decreases substantially linearly with increasing total groove area. This is because the amount of lubricant fed to between the outer clutch plate 5 and the inner clutch plate 6 increases consistently with the total groove area, and thus the distance between the clutch plates increases in the axial direction.

The clutch apparatus 1 more preferably has a higher magnetic flux density with respect to the current supplied to the electromagnetic coil 11. This is because a higher magnetic flux density allows a higher frictional force (braking force) to be generated between the outer clutch plate 5 and the inner clutch plate 6. The clutch apparatus 1 more preferably has a lower drag torque. This is because the drag torque acts as a rotational resistance while the clutch apparatus 1 is in an inoperative state.

In the present embodiment, the total groove area is set to between 90 and 110% (90% or more and 110% or less) of the maximum lubrication groove area (predetermined value S1) in order to achieve both suppression of a decrease in the frictional force that can be generated in the clutch portion 10 and reduction of the drag torque. In FIG. 4, this range is shown as a suitable range. A total groove area of less than 90% of the maximum lubrication groove area results in a high drag torque. On the other hand, a total groove area of more than 110% of the maximum lubrication groove area results in a reduced magnetic flux density.

The total groove area is desirably set equal to 110% or less of the maximum lubrication groove area in order to reduce the drag torque in a range that the frictional force that can be generated in the clutch portion 10 is not reduced. That is, a more suitable range of the total groove area is 90 to 110% of the maximum lubrication groove area.

In the present embodiment, the clutch portion 10 is configured so that the magnetic path G does not contain a air gap when a current is supplied to the electromagnetic coil 11 to bring the yoke 4, the outer clutch plate 5, the inner clutch plate 6, and the armature 7 into contact with one another, in order to generate a magnetic flux with a high magnetic flux density in the magnetic path G by use of as small an excitation current as possible. In other words, when a air gap is formed between the yoke and the rear housing as in the apparatus described in JP 2005-3167 A, the air gap offers a large magnetic resistance, and accordingly, the magnetic path cannot be saturated with magnetic fluxes unless a larger current is supplied to the electromagnetic coil 11. However, in the present embodiment, since the clutch portion 10 is configured so that the magnetic path G does not contain a air gap, the magnetic path G can be saturated with magnetic fluxes by use of a smaller excitation current.

The above-described first embodiment enables a reduction in drag torque while suppressing a decrease in frictional force that may result from loss of a magnetic flux from the electromagnetic coil 11.

Now, a second embodiment of the invention will be described with reference to FIG. 5 and FIG. 6.

A clutch apparatus 1A according to the present embodiment is different from the clutch apparatus in the first embodiment in a configuration of a clutch portion 10A. That is, in the description of the first embodiment, the clutch portion 10 has, as a plurality of soft magnetic materials, the yoke 4, the outer clutch plate 5, the inner clutch plate 6, and the armature 7. However, the outer clutch plate 5 and the inner clutch plate 6 are omitted from the clutch portion 10A in the present embodiment, and the relative rotation between the housing member 2 and the shaft 3 is suppressed based on the frictional contact between the yoke 4 and the armature 7.

The clutch apparatus 1A in the present embodiment is similar to the clutch apparatus 1 according to the first embodiment in the configuration of the remaining part. Thus, in FIG. 5 and FIG. 6, for example, members that have functions similar to those described in the first embodiment are denoted by common reference numerals, and duplicate descriptions of these members are omitted.

Figure 5:
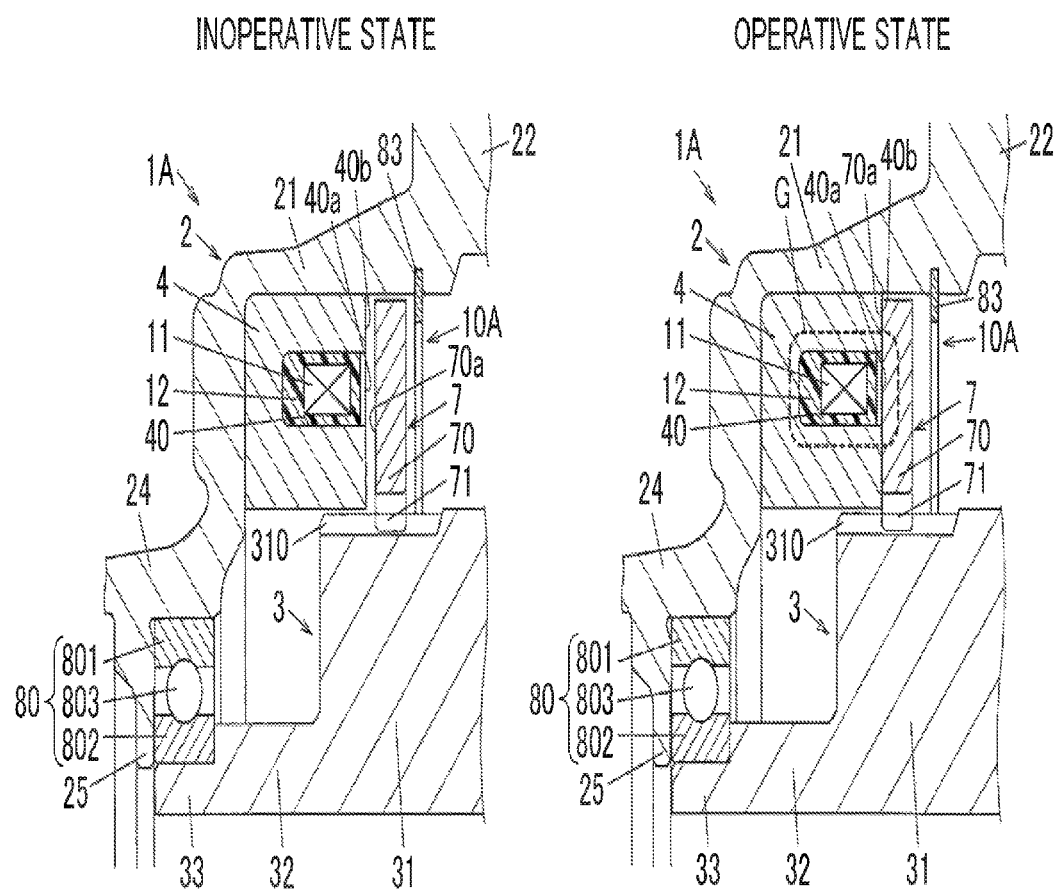
FIG. 5 is enlarged views of a part of a clutch apparatus according to a second embodiment of the invention, depicting a section of the part taken along the axial direction and illustrating the inoperative state and the operative state, respectively.

FIG. 5 is an enlarged view of a part of the clutch apparatus 1A according to the present embodiment, depicting a section of the part taken along the axial direction. A left figure illustrates an inoperative state, and a right figure illustrates an operative state.

A surface of the armature 7 that faces the yoke 4 in the axial direction is formed as the contact surface 70a that frictionally contacts the contact surface 40b of the yoke 4 while the clutch apparatus 1 is in the operative state. With the engaging protrusions 71 engaged with the spline engaging portion 310 of the shaft 3, the armature 7 is coupled to the shaft 3 so as to be movable in the axial direction and to be non-rotatable relative to the shaft 3. On the other hand, the yoke 4 is fixed to the housing member 2 by the bolts 81 (depicted in FIG. 1), and the contact surface 40b of the yoke 4 is formed like a flat surface without grooves, as is the case with the first embodiment.

An upper figure in FIG. 6 is a plan view depicting the entire armature 7 as seen from the contact surface 70a. Lower figures in FIG. 6 are an enlarged view of a D portion in the plan view and an E-E sectional view of the D portion in the enlarged view. The E-E sectional view depicts a sectional shape of the armature.

A plurality of lubrication grooves 72 through which a lubricant flows is formed in the contact surface 70a of the armature 7. The lubrication grooves 72 include a plurality of first lubrication grooves 721 inclined in a first direction with respect to the radial direction of the armature 7 and a plurality of second lubrication grooves 722 inclined in a second direction with respect to the radial direction of the armature 7. The first lubrication grooves 721 and the second lubrication grooves 722 have an equal groove width and an equal groove depth. The first lubrication grooves 721 and the second lubrication grooves 722 cross one another in a lattice form. Quadrangular land portions 73 are each formed between a pair of adjacent first lubrication grooves 721 and a pair of adjacent second lubrication grooves 722. A top surface 73a of each land portion 73 is shaped like a flat surface. The lubrication grooves 72 have a groove width w of, for example, 0.3 mm and a groove depth d of, for example, 0.16 mm.

The main body portion 70 of the armature 7 integrally has an annular intermediate portion 700 that faces the openings 40a of the recessed portion 40 of the yoke 4, an outer peripheral portion 701 located on the outer peripheral side with respect to the intermediate portion 700, and an inner peripheral portion 702 located on the inner peripheral side with respect to the intermediate portion 700. When a current is conducted through the electromagnetic coil 11 and the resultant magnetic force attracts the armature 7 toward the yoke 4, the outer peripheral portion 701 of the main body portion 70 of the armature 7 comes into contact with a part of the contact surface 40b of the yoke 4 located outward of the recessed portion 40. Furthermore, the inner peripheral portion 702 of the main body portion 70 of the armature 7 comes into contact with a part of the contact surface 40b of the yoke 4 located inward of the recessed portion 40.

In the present embodiment, the lubrication grooves 72 through which the lubricant flows are formed only in the contact surface 70a of the armature 7, and the outer peripheral portion 701 and inner peripheral portion 702 of the main body portion 70 are included in the magnetic path G for magnetic fluxes. Consequently, the total groove area of the lubrication grooves 72 formed in the contact surface 70a of the outer peripheral portion 701 and inner peripheral portion 702 is equal to the total groove area based on the above-described definition.

In the clutch apparatus 1A according to the present embodiment, the drag torque tends to reduce and the magnetic flux density tends to increase as the total groove area increases, as in the clutch apparatus 1 according to the first embodiment. However, the magnetic flux density resulting from the supply of a current with the maximum value to the electromagnetic coil 11 is constant when the total groove area has a predetermined value or smaller, and gradually decreases when the total groove area exceeds the predetermined value. The predetermined value corresponds to the maximum lubrication groove area defined in the first embodiment.

In the present embodiment, the total groove area is set to between 90 and 110% (90% or more and 110% or less) of the maximum lubrication groove area in order to achieve both suppression of a decrease in the frictional force that can be generated in the clutch portion 10A and reduction of the drag torque, as is the case with the first embodiment. The total groove area is desirably set equal to or smaller than the maximum lubrication groove area in order to reduce the drag torque in a range that the frictional force that can be generated in the clutch portion 10A is not reduced.

In the present embodiment, the clutch portion 10A is configured so that the magnetic path G does not contain a air gap when a current is supplied to the electromagnetic coil 11 to bring the yoke 4 and the armature 7 into contact with each other, in order to allow the magnetic path G to be saturated with magnetic fluxes by use of as small an excitation current as possible.

The above-described second embodiment can produce effects similar to the effects described for the first embodiment. Since the outer clutch plate 5 and the inner clutch plate 6 are omitted from the clutch portion 10A according to the second embodiment, the number of components and assembly man-hour can be reduced.

The frictional engagement apparatus in the present invention has been described based on the first and second embodiments. However, the present invention is not limited to these embodiments.

For example, in the above-described first and second embodiments, the housing member 2 is a non-rotating member fixed to the support member. However, the housing member 2 may be a rotating member. That is, a rotational torque may be transmitted between the housing member 2 and the shaft 3 based on the frictional force generated between the outer clutch plate 5 and the inner clutch plate 6 or between the yoke 4 and the armature 7.

The above-described first embodiment includes the single outer clutch plate 5 and the single inner clutch plate 6. However, the present invention is not limited to this, and a plurality of the outer clutch plates 5 and a plurality of the inner clutch plates 6 may be alternately arranged. In this case, the total groove area is obtained by multiplying the total groove area in the single inner clutch plate 6 by the number of the inner clutch plates 6.

In the above-described first embodiment, the lubrication grooves 64 are formed only in the inner clutch plate 6 and no lubrication grooves are formed in the outer clutch plate 5. However, in contrast, the lubrication grooves may be formed exclusively in the outer clutch plate 5 and lubrication grooves may not be formed in the inner clutch plate 6. Moreover, the lubrication grooves may be formed both in the outer clutch plate 5 and in the inner clutch plate 6. In this case, the total groove area is equal to the sum of the total groove area in the outer-peripheral main body portion 501 and inner-peripheral main body portion 502 of the outer clutch plate 5 and the total groove area in the outer-peripheral main body portion 601 and inner-peripheral main body portion 602 of the inner clutch plate 6.

What is claimed is:

1. An electromagnetic frictional engagement apparatus comprising:
   a housing member in which a housing space is formed;
   a clutch portion housed in the housing space to couple the housing member in a disengageable manner to a rotating member disposed so as to be rotatable relative to the housing member; and
   an electromagnetic coil that generates a magnetic force that actuates the clutch portion, wherein
   the clutch portion has a plurality of soft magnetic materials that forms a magnetic path for a magnetic flux resulting from conduction of a current through the electromagnetic coil,
   for some of the soft magnetic materials, rotation relative to the housing is regulated, for others of the soft magnetic materials, rotation relative to the rotating member is regulated, and the some of the soft magnetic materials and the others of the soft magnetic materials come into frictional contact with one another by the magnetic force to suppress relative rotation between the housing member and the rotating member,
   lubrication grooves through which a lubricant flows are formed in at least some of contact surfaces of the soft magnetic materials, and
   among the lubrication grooves formed in the contact surfaces of the soft magnetic materials, a total of groove areas of a portion of the lubrication grooves that is included in the magnetic path is 110% or less of a maximum lubrication groove area that is a maximum value of the total of the groove areas within a range that magnetic flux density resulting from saturation of the magnetic path with magnetic fluxes is not reduced.

2. The electromagnetic frictional engagement apparatus according to claim 1, wherein,
   the total of the groove areas is 90 to 110% of the maximum lubrication groove area.

3. The electromagnetic frictional engagement apparatus according to claim 1, wherein,
   when a magnetic flux is generated in the magnetic path to bring the soft magnetic materials into contact with one another, the magnetic path contains no air gap.

4. The electromagnetic frictional engagement apparatus according to claim 2, wherein,
   when a magnetic flux is generated in the magnetic path to bring the soft magnetic materials into contact with one another, the magnetic path contains no air gap.

* * * * *